Aug. 4, 1931.  G. JOHNSON  1,817,825

CHAIN HOOK

Filed Jan. 2, 1931

Inventor
Gustaf Johnson.
By Geo. Stevens.
Attorney

Patented Aug. 4, 1931

1,817,825

UNITED STATES PATENT OFFICE

GUSTAF JOHNSON, OF DULUTH, MINNESOTA

CHAIN HOOK

Application filed January 2, 1931. Serial No. 506,091.

This invention relates to chain hooks, the principal object being to provide a hook of this character not requiring any special form of locking device other than that inherent in itself and residing wholly in the peculiar shape thereof.

Other objects and advantages of the invention will appear in the following description thereof.

Referring now to the accompanying drawings, forming part of this application, and wherein like reference characters indicate like parts:

Figure 1:
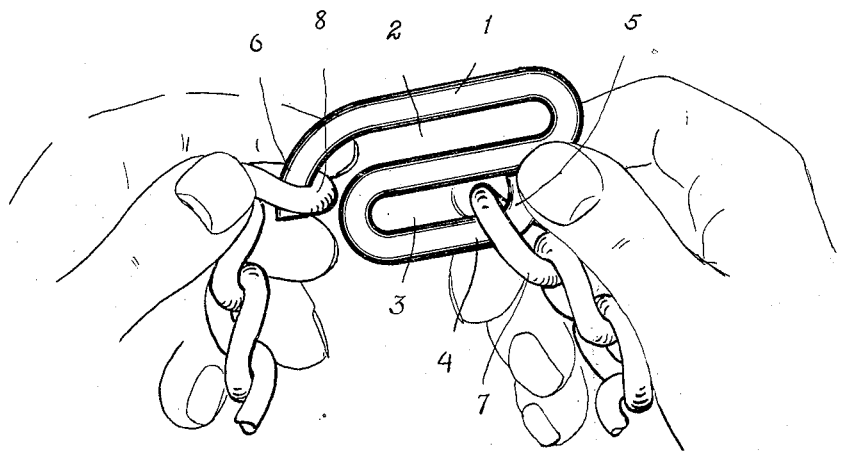
Figure 1 is an elevation showing an applicatory view of a hook embodying the invention.

The hook is made preferably of metal, likened in size and quality to that of which the chain to which it is attached is composed, and in the instant embodiment is illustrated as applied to a common anti-skid chain for automobiles, that is to say a length of twisted link chain commonly used in wrapping about an automobile tire in emergency.

The main body portion of the hook comprising the elongated link indicated at 1, being open at one end and closed at the opposite end, forming the elongated bight or slot 2 therein, and a second slot or bight 3 is formed parallel therewith by the terminal 4 being doubled back on one side of the body portion and terminating in the bent end 5 close to the body portion and closing the bight 3.

The free end of the opposite terminous of the link illustrated at 6 is arcuate in shape and follows the contour of the adjacent end of the bight or eye 3, and terminates approximately in a plane with the longitudinal axis of said eye.

The terminal link 7 of the chain to which the hook is attached is permanently connected within the eye 3 while the free end 6 of the hook is engageable within any of the other links of the chain, or any other similar object with which it is desired to make connection, and in the accompanying drawings I have illustrated the hook as being applied to the terminal link 8 of the chain.

Figures 2, 3:
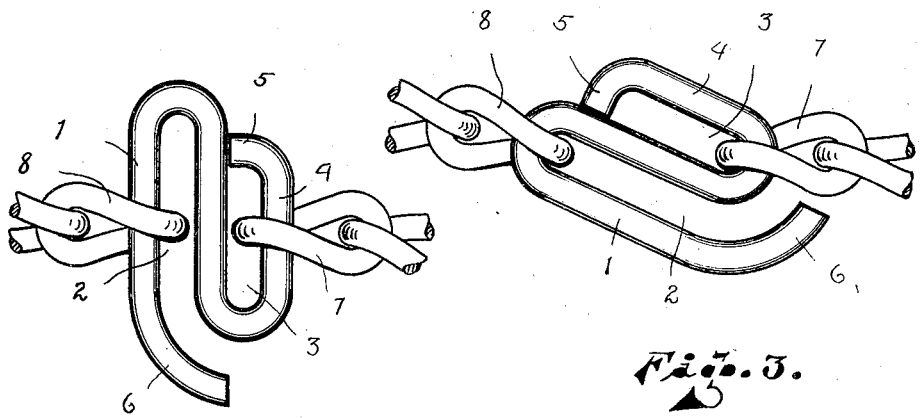
Figure 2 is an elevation of the hook illustrating one of its positions during the application thereof to a chain.
Figure 3 is a similar view showing the hook in its ultimate position when acting as a link in the chain.

Now the novel feature of the hook resides in the fact that at such application as illustrated in Figure 1 the two terminal links 7 and 8 are at their maximum distance apart when engaging the hook, and as such engagement continues towards ultimate connection, the two links will approach each other as clearly illustrated in Figure 2 until when directly opposite they are at their nearest point of engagement, and from which point during the further process of union they become spaced farther apart due to the link 7 in the eye 3 assuming position in the opposite end of the eye to what it was at the initial engagement, such position being clearly seen in Figure 3 of the drawings when the two terminal links again assume their maximum spaced relation.

Thus it is obvious that the two links engaged within the hook are initially at their predetermined maximum distance apart affording ease of access during the hooking process, subsequently drawn closer together and again released, which clearly tends to maintain the hook in its properly engaged relation to the ends of the chain, and when thus engaged assumes a substantially longitudinal attitude with the links of the chain, with the terminal end 6 normally adjacent the link 7, and thus closed to engagement by any foreign element, the object of which is obvious.

Having thus described my invention, what I claim and desire to secure by Letters Patent, is:

1. A substantially S-shaped chain hook, the loops of which are elongated in parallelism, one being shorter than the other, and further characterized by the shorter loop being permanently and slidably adjustably attached to one end of the chain and the free arcuate end of the hook terminating substantially in a plane with the axis of the shorter bight.

2. A chain hook of the type described formed of a metal rod bent upon itself in opposite directions forming three parallel equispaced main body portions intermediate of which two parallel elongated loops are formed, one slightly shorter than the other, the shorter one of said loops being closed and slidably attached to a link of a chain, the other of said loops terminating in an arcuate portion concentric with the bend in the shorter loop.

In testimony whereof I affix my signature.

GUSTAF JOHNSON.